(12) United States Patent
Croyle (10) Patent No.: US 11,288,974 B2
(45) Date of Patent: *Mar. 29, 2022

(54) SPEECH DEVELOPMENT SYSTEM

(71) Applicant: Edana Croyle, Waco, TX (US)

(72) Inventor: Edana Croyle, Waco, TX (US)

( * ) Notice: Subject to any disclaimer, the term of this patent is extended or adjusted under 35 U.S.C. 154(b) by 124 days.

This patent is subject to a terminal disclaimer.

(21) Appl. No.: 16/662,674

(22) Filed: Oct. 24, 2019

(65) Prior Publication Data

US 2020/0302814 A1    Sep. 24, 2020

Related U.S. Application Data

(63) Continuation-in-part of application No. 16/359,305, filed on Mar. 20, 2019.

(51) Int. Cl.
| | |
|---|---|
| *G09B 5/04* | (2006.01) |
| *A63H 3/00* | (2006.01) |
| *A63H 3/02* | (2006.01) |
| *A63H 3/28* | (2006.01) |
| *G10L 15/22* | (2006.01) |
| *G10L 15/30* | (2013.01) |
| *G10L 25/51* | (2013.01) |
| *A63H 3/46* | (2006.01) |
| *H04R 1/04* | (2006.01) |
| *H04R 1/02* | (2006.01) |

(52) U.S. Cl.
CPC ............... *G09B 5/04* (2013.01); *A63H 3/003* (2013.01); *A63H 3/02* (2013.01); *A63H 3/28* (2013.01); *G10L 15/22* (2013.01); *G10L 15/30* (2013.01); *G10L 25/51* (2013.01); *H04R 1/025* (2013.01); *H04R 1/04* (2013.01); *A63H 3/006* (2013.01); *A63H 3/46* (2013.01); *A63H 2200/00* (2013.01)

(58) Field of Classification Search
CPC . G59B 5/02; G59B 5/04; A63H 3/003; A63H 3/006; A63H 3/02; A63H 3/28; A63H 3/46; A63H 2200/00; G10L 15/22; G10L 2015/227; G10L 25/51
USPC ........................................................ 434/185
See application file for complete search history.

(56) References Cited

U.S. PATENT DOCUMENTS

| | | | | |
|---|---|---|---|---|
| 3,384,074 | A | * 5/1968 | Rautiola | G10K 15/02 600/28 |
| 4,221,927 | A |   9/1980 | Dankman | |
| 5,004,442 | A | * 4/1991 | Lemelson | A63H 3/36 446/268 |

(Continued)

*Primary Examiner* — Joseph B Baldori (57) ABSTRACT

A control circuit is positioned within a stuffed animal. A microphone is coupled to the stuffed animal to record babbling of an infant or speech delayed toddler to electronic memory. A transceiver positioned in the stuffed animal is operationally coupled to the control circuit. A database comprising sounds grouped according to defined stages of speech development is accessible by the control circuit through the transceiver. A vocal analyzer is positioned within the stuffed animal and the vocal analyzer is electrically coupled to the control circuit. The vocal analyzer analyzes the babbling of the infant or speech delayed toddler that is stored in the electronic memory. The vocally analyzer assigns selected words and phrases in the database stored in the electronic memory to a response sequence. A speaker is coupled to the stuffed animal to emit the words and phrases corresponding to the response sequence for the purposes of education.

9 Claims, 5 Drawing Sheets

(56) References Cited

U.S. PATENT DOCUMENTS

| | | | |
|---|---|---|---|
| 5,376,038 A | 12/1994 | Arad | |
| 5,487,671 A * | 1/1996 | Shpiro | G09B 7/04 434/185 |
| 5,607,336 A * | 3/1997 | Lebensfeld | A63H 3/28 446/297 |
| 5,679,001 A * | 10/1997 | Russell | G10L 15/26 434/185 |
| 5,884,257 A | 3/1999 | Maekawa | |
| 5,893,720 A * | 4/1999 | Cohen | G09B 19/04 434/327 |
| 6,514,117 B1 | 2/2003 | Hampton | |
| 6,517,351 B2 * | 2/2003 | Spector | G09B 17/006 434/169 |
| 6,554,616 B1 * | 4/2003 | Love | A63H 3/28 434/157 |
| 6,663,393 B1 * | 12/2003 | Ghaly | A63H 3/28 434/262 |
| 6,851,999 B2 * | 2/2005 | Fong | A63H 3/006 446/175 |
| 7,671,266 B2 * | 3/2010 | Lemons | G09B 21/009 84/609 |
| 8,078,465 B2 * | 12/2011 | Paul | G06N 20/00 704/254 |
| 9,275,517 B2 | 3/2016 | Cohen | |
| 9,390,626 B1 * | 7/2016 | Horowitz | G09B 5/04 |
| 10,223,934 B2 * | 3/2019 | Paul | A61B 5/4803 |
| 10,916,154 B2 * | 2/2021 | Amin | G10L 15/26 |
| 2002/0177112 A1 * | 11/2002 | Heller | G09B 21/009 434/308 |
| 2005/0119894 A1 * | 6/2005 | Cutler | G10L 17/26 704/270 |
| 2005/0154594 A1 | 7/2005 | Beck | |
| 2013/0280985 A1 * | 10/2013 | Klein | A63N 3/003 446/297 |
| 2014/0206253 A1 * | 7/2014 | Huyck | A63H 30/04 446/175 |
| 2014/0220855 A1 * | 8/2014 | Heilbron | A63H 13/005 446/175 |
| 2020/0358629 A1 * | 11/2020 | Panec | H04L 12/1881 |

* cited by examiner

SPEECH DEVELOPMENT SYSTEM

CROSS-REFERENCE TO RELATED APPLICATIONS

This is a continuation in part of U.S. patent application Ser. No. 16/359,305 filed on Mar. 20, 2019.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to speech development devices and more particularly pertains to a new speech development device for teaching an infant or speech delayed toddler proper language patterns.

BRIEF SUMMARY OF THE INVENTION

An embodiment of the disclosure meets the needs presented above by generally comprising a stuffed animal. A control circuit is positioned within the stuffed animal and the control circuit includes an electronic memory. A microphone is coupled to the stuffed animal to record babbling of an infant or speech delayed toddler to the electronic memory. A transceiver positioned in the stuffed animal is operationally coupled to the control circuit. A database comprising sounds grouped according to defined stages of speech development is accessible by the control circuit through the transceiver. A vocal analyzer is positioned within the stuffed animal and the vocal analyzer is electrically coupled to the control circuit. The vocal analyzer analyzes the babbling of the infant or speech delayed toddler that is stored in the electronic memory. The vocally analyzer assigns selected words and phrases in the database stored in the electronic memory to a response sequence. A speaker is coupled to the stuffed animal to emit the words and phrases corresponding to the response sequence for the purposes of education.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
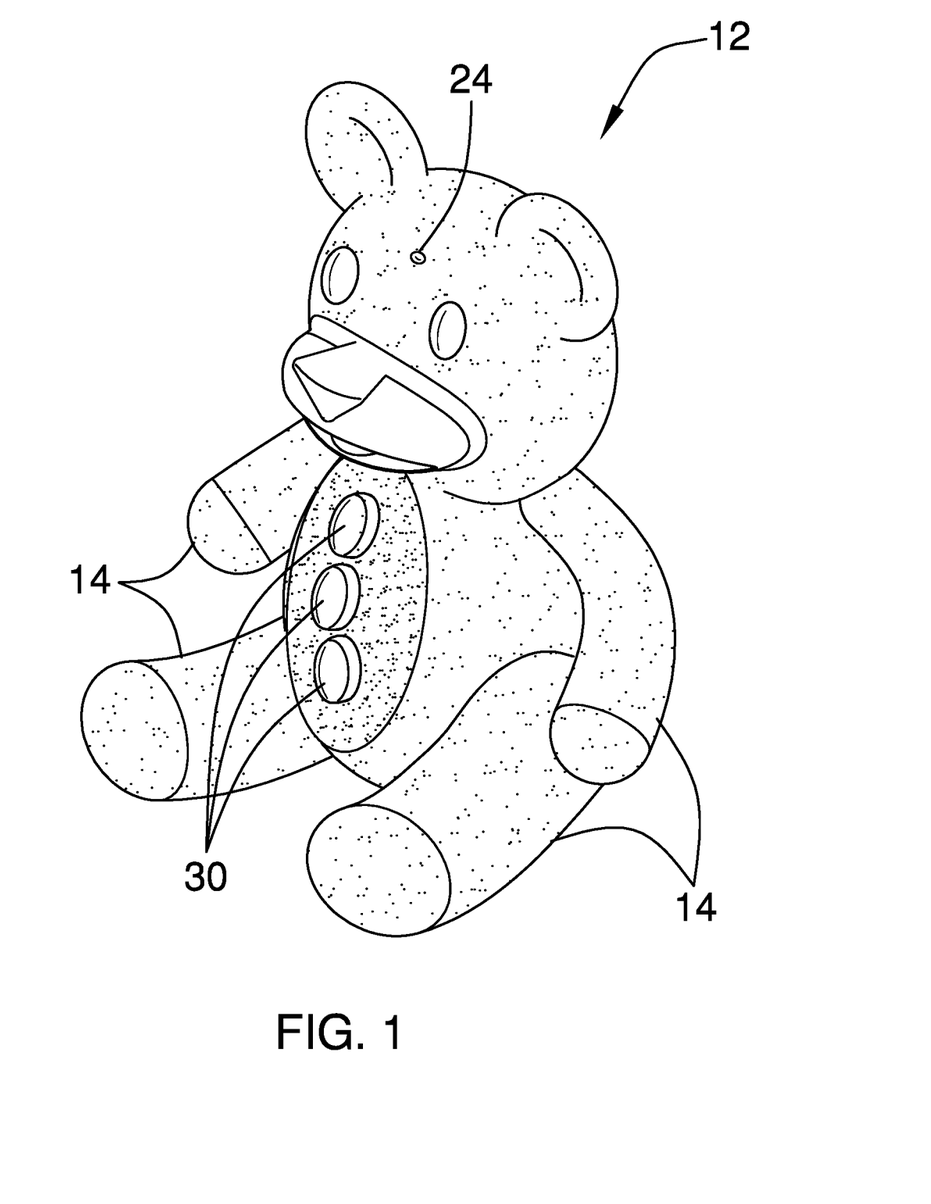
FIG. 1 is a front perspective view of a speech development system according to an embodiment of the disclosure showing a stuffed animal as a teddy bear.
Figure 2:
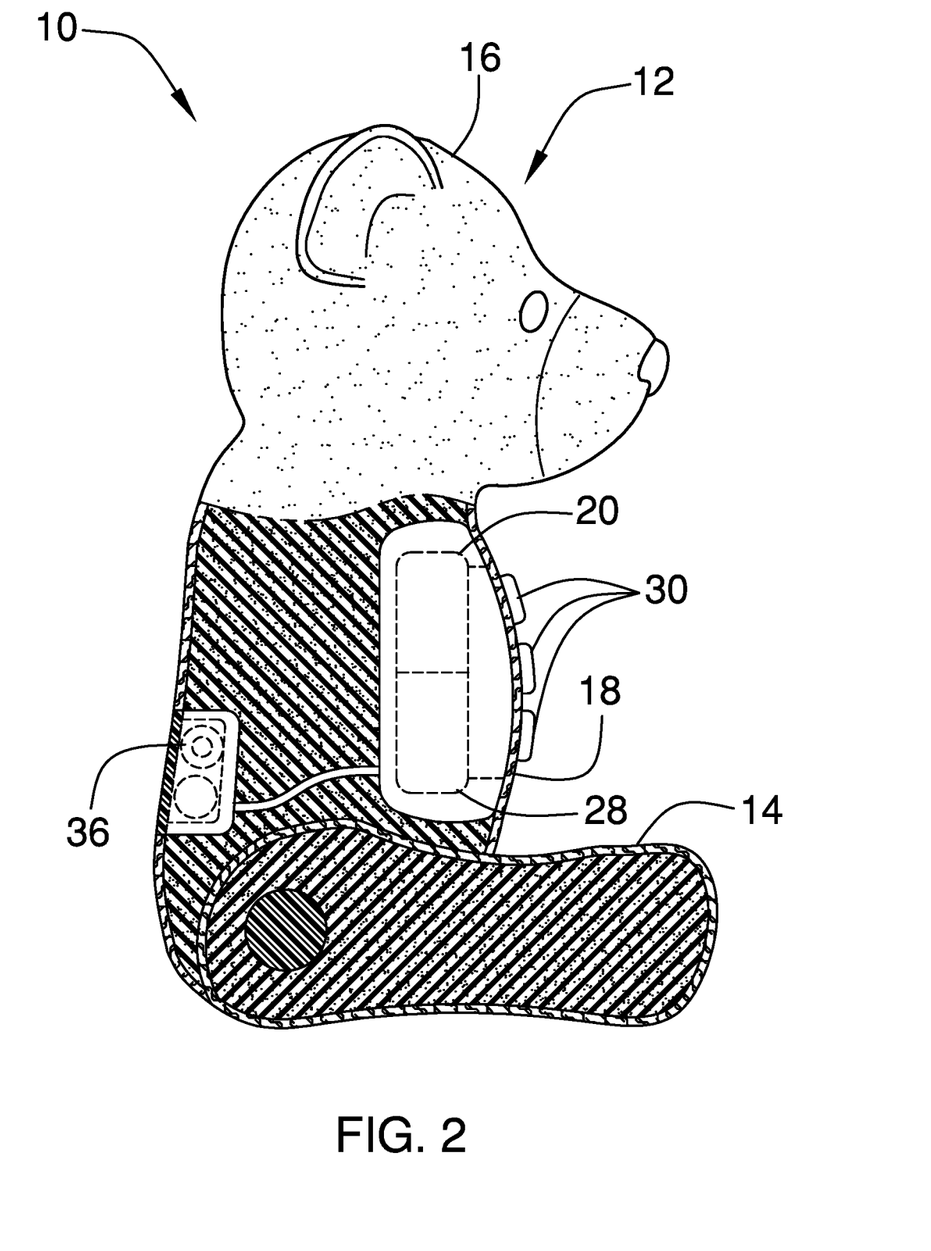
FIG. 2 is a right side cut-away view of an embodiment of the disclosure.
Figure 3:
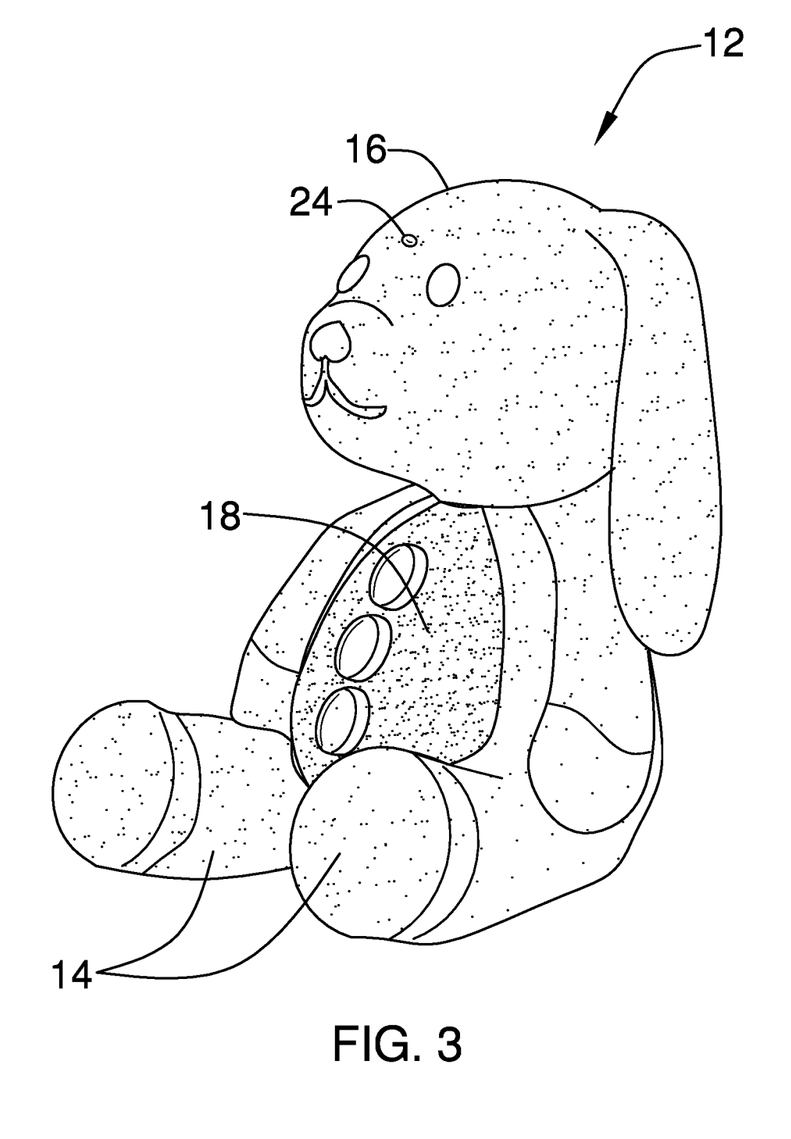
FIG. 3 is a left side perspective view of an embodiment of the disclosure showing a stuffed animal as a bunny.
Figure 4:
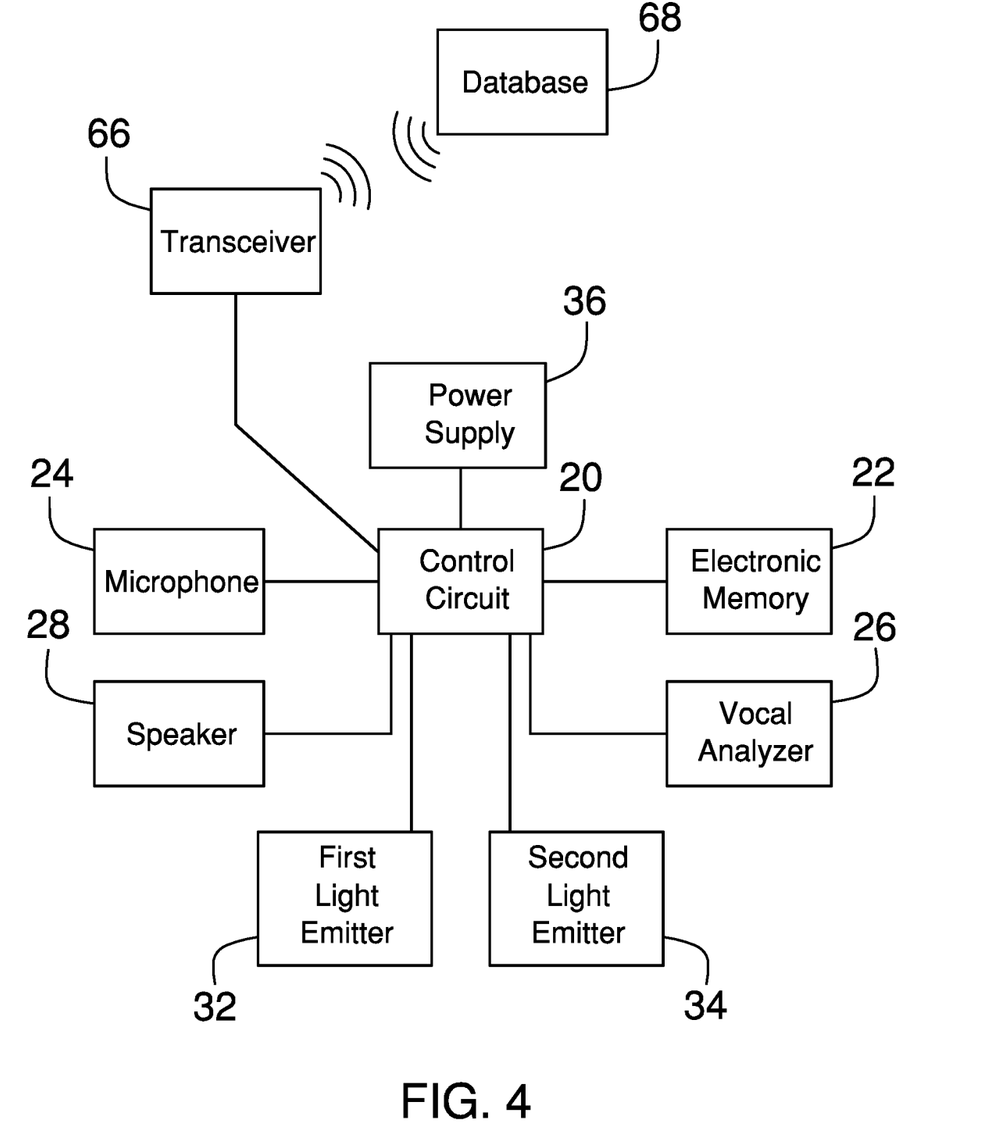
FIG. 4 is a schematic view of an embodiment of the disclosure.
Figure 5:
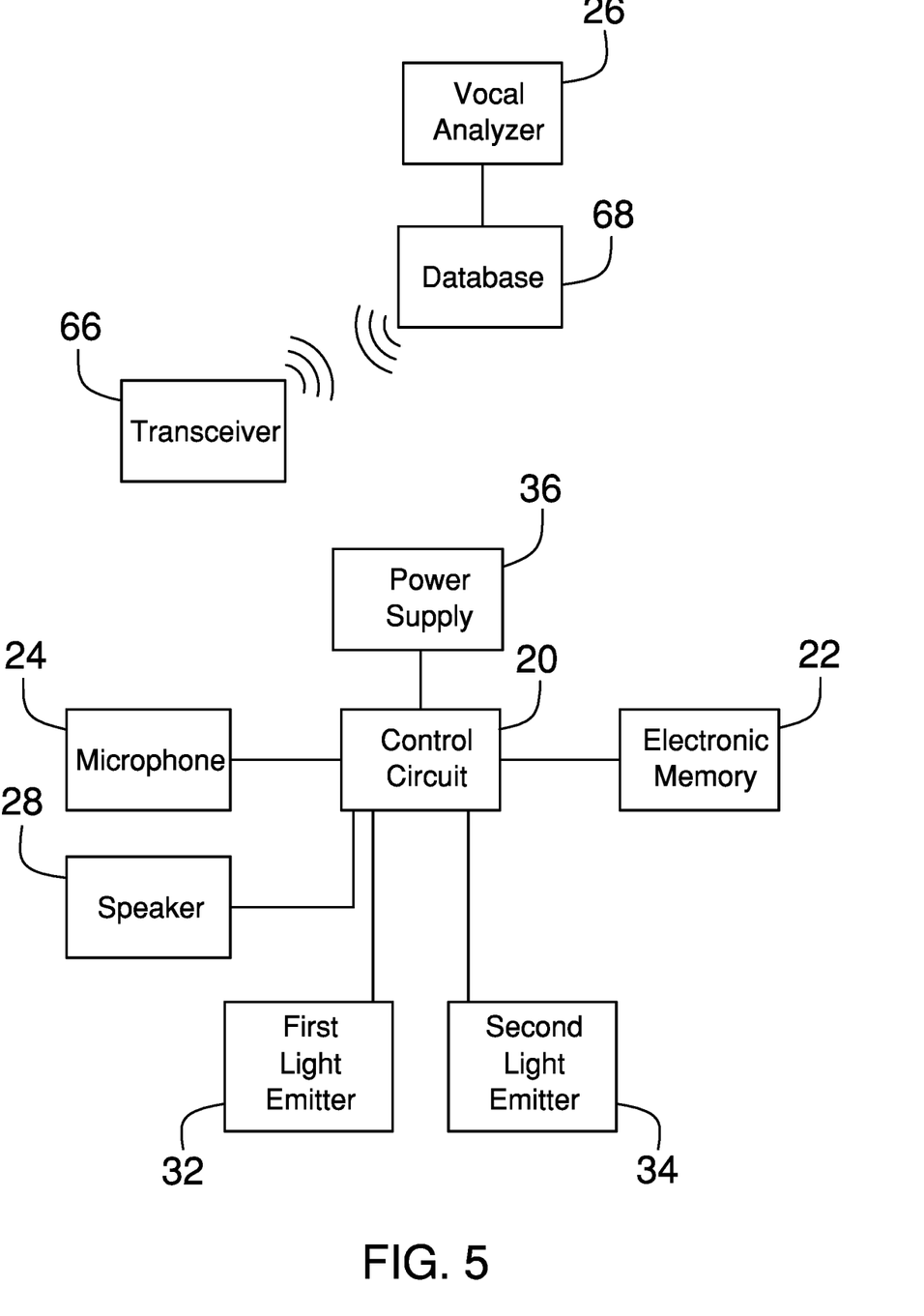
FIG. 5 is a schematic of an alternative configuration of an embodiment of the disclosure.

With reference now to the drawings, and in particular to FIGS. 1 through 5 thereof, a new speech development device embodying the principles and concepts of an embodiment of the disclosure and generally designated by the reference numeral 10 will be described.

As best illustrated in FIGS. 1 through 5, the speech development system 10 generally comprises a stuffed animal 12 that has appendages 14 which can be resiliently articulated into a variety of positions. In this way the stuffed animal 12 may appeal to an infant or a speech delayed toddler. The stuffed animal 12 has a head 16 and a stomach 18, and the stuffed animal 12 may be designed to resemble any number of animals known to be soothing and attractive to children. A control circuit 20 is positioned within the stuffed animal 12 and the control circuit 20 includes a local electronic memory 22. A transceiver 66 is operationally coupled to the control circuit 20 and positioned in the stuffed animal 12. An external database 68 stores sounds grouped into defined stages of speech development. An example of such can be found through the web site vocaldevelopments-.com which has information relating to a three category system which is adapted from "The Stark Assessment of Early Vocal Development—Revised" (SAEVD-Ertmer, and Stark, 2006). Various other research has been made into the particular sounds made through the progression from grunting and cooing to formation of simple and later more complex words. The stages of speech may incorporate gurgles, cooing, grunting, other sounds made as a prelude to formation of actual words, on into the use of monosyllabic words, and then multi-syllabic words and phrases. Thus, the stages may also incorporate actual words and even phrases to promote natural progression and learning through multiple stages of speech development. Different models are known defining two or more stages of speech development.

It is contemplated that at least some of these would be known and familiar to one of ordinary skill in the art. The groupings of sounds may be in accordance to any particular known model having two or more defined stages of speech development or in accordance with any model using defined stages of speech development wherein common characteristics of sounds produced separate and define the progressive stages. The database 68 is communicatively and operationally accessed by the transceiver 66 through networking in a conventional manner.

A microphone 24 is coupled to the stuffed animal 12 to record babbling of an infant or speech delayed toddler that is playing with the stuffed animal 12. The microphone 24 is electrically coupled to the control circuit 20 such that the electronic memory 22 stores the sounds produced by the infant or speech delayed toddler. The microphone 24 may be an electronic microphone 24 of any conventional design.

A vocal analyzer 26 is provided. The vocal analyzer 26 may be positioned within the stuffed animal 12 or extrinsic to the stuffed animal 12 and associated with the database 68. The vocal analyzer 26 is operationally coupled to the control circuit 20 either electrically or through conventional networking. The vocal analyzer 26 analyzes the recorded sounds of the infant or speech delayed toddler which may be stored in the electronic memory 22. Moreover, the vocal analyzer 26 determines and categorizes the sound recorded according to specific levels of speech development. The vocal analyzer 26 communicates through the control circuit 20 to initiate playback of sounds from the database 68 also categorized within the specific level of speech development of the infant or speech delayed toddler. The playback initiated may also provide sounds categorized in the next stage of speech development beyond the specific stage of speech development determined for the sounds produced by the infant or speech delayed toddler. In this way the vocal analyzer 26 can identify the most effective sounds, words and phrases for teaching proper speech patterns and the infant or speech delayed toddler is exposed to current and next level sounds.

A speaker 28 is coupled to the stuffed animal 12 to emit audible sounds outwardly therefrom. The speaker 28 is electrically coupled to the control circuit 20, and the speaker 28 emits the sounds, words and phrases corresponding to the initiated playback from the database. In this way the speaker 28 communicates the sounds to the infant or speech delayed toddler for the purposes of education. Additionally, the recorded sounds from the infant or speech delayed toddler may be saved, categorized and incorporated into the database for later playback initiated by the control circuit. Thus, these recorded sounds are spoken in the child's voice stored in the electronic memory 22. In this way the speaker 28 simulates conversation between the infant or speech delayed toddler and a peer of like or slightly advanced verbal abilities to promote progression through the developmental stages of speech.

Each of a plurality of control buttons 30 is movably coupled to the stuffed animal 12 and each of the control buttons 30 is electrically coupled to the control circuit 20. Each of the control buttons 30 controls operational parameters of the control circuit 20, the microphone 24 and the speaker 28, such as volume level, off, on, and the like. Additionally, one of the control buttons 30 is a selector. The selector allows for a desired selected stage of speech development to be used for playback essentially overriding automated selection of a developmental stage by the vocal analyzer 26. Each of the control buttons 30 is positioned on the stomach 18 of the stuffed animal 12.

A first light emitter 32 is coupled to the stuffed animal 12 and the first light emitter 32 is electrically coupled to the control circuit 20. The first light emitter 32 emits red light when the first light emitter 32 is turned on. Additionally, the first light emitter 32 is turned on when the infant or speech delayed toddler is to go to sleep. A second light emitter 34 is coupled to the stuffed animal 12 and the second light emitter 34 is electrically coupled to the control circuit 20. The second light emitter 34 emits blue light when the second light emitter 34 is turned on. Moreover, the second light emitter 34 is turned on when the infant or speech delayed toddler is to wake up. Each of the first 32 and second 34 light emitters may comprise an LED or the like. A power supply 36 is positioned within the stuffed animal 12, the power supply 36 is electrically coupled to the control circuit 20 and the power supply 36 comprises at least one battery.

It is intended that the vocal capabilities of the child are improved through repetitive exposure to stage appropriate sounds. The pre-recorded sounds played to the child from the database 68 are categorized and grouped according to typical sounds made by a child as the child moves through defined stages while learning to speak. In use, the stuffed animal 12 is positioned in a crib, play area or other location that the infant or speech delayed toddler will occupy. The microphone 24 records the babbling and other sounds spoken by the infant or speech delayed toddler. The vocal analyzer 26 compares the babbling and other sounds to the database 68 to categorize the recorded sounds by the categorized stages of speech development. Moreover, the vocal analyzer 26 communicates with the control circuit 20 to initiate playback of a sound from the database 68. The initiated playback may match the development stage of the child as determined by analysis of the recorded sound made by the child. Alternatively, the playback may be sounds associated with or defined to be within a next progressive level of speech development of the selector may be utilized to allow for selection of sounds, words, or phrases in a specific developmental stage if desired instead of allowing for automated stage selection based on the vocal analyzer selection. In this way the speaker 28 emits the words or phrases assigned to the response sequence that are most likely to assist the infant or speech delayed toddler with improving language skills. Additionally, the first 32 and second 34 light emitters are selectively turned on during the respective sleep time and wake time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A speech development system being configured to record sounds made by a speech delayed child and emit sounds made by a speech advanced child for enhancing speech learning skills, said system comprising:
   a stuffed animal;
   a control circuit being positioned within said stuffed animal, said control circuit including an electronic memory;
   a microphone being coupled to said stuffed animal wherein said microphone is configured to record sounds produced by an infant or speech delayed toddler to said electronic memory;
   a transceiver positioned in said stuffed animal, said transceiver being operationally coupled to said control circuit;
   a database comprising sounds grouped according to defined stages of speech development, said database being accessible by said control circuit through said transceiver;
   a vocal analyzer, said vocal analyzer being operationally coupled to said control circuit, said vocal analyzer analyzing the sounds recorded by the microphone, said vocal analyzer categorizing the sounds recorded to determine which of the defined stages of speech development corresponds to the sounds recorded, said vocal analyzer communicating with said control circuit for initiating playback of sounds within the defined stages of speech development corresponding to the sounds recorded; and
   a speaker being coupled to said stuffed animal wherein said speaker is configured to emit the sounds within the determined specific stage of speech development.

2. The system according to claim 1, wherein said microphone is electrically coupled to said control circuit such that said electronic memory stores the sounds produced by the infant or speech delayed toddler.

3. A speech development system being configured to record sounds made by a speech delayed child and emit sounds made by a speech advanced child for enhancing speech learning skills, said system comprising:
   a stuffed animal;
   a control circuit being positioned within said stuffed animal, said control circuit including an electronic memory;
   a microphone being coupled to said stuffed animal wherein said microphone is configured to record sounds produced by an infant or speech delayed toddler, said microphone being electrically coupled to said control circuit such that said electronic memory stores the sounds produced by the infant or speech delayed toddler to said electronic memory;
   a transceiver positioned in said stuffed animal, said transceiver being operationally coupled to said control circuit;
   a database comprising sounds grouped according to defined stages of speech development, said database being accessible by said control circuit through said transceiver;
   a vocal analyzer, said vocal analyzer being communicatively coupled to said control circuit, said vocal analyzer analyzing the sounds produced by the infant or speech delayed toddler, said vocal analyzer categorizing the sounds recorded to determine which of the defined stages of speech development corresponds to the sounds recorded, said vocal analyzer communicating with said control circuit for initiating playback of sounds within the defined stages of speech development corresponding to the sounds recorded; and
   a speaker being coupled to said stuffed animal wherein said speaker is configured to emit audible sounds outwardly therefrom, said speaker being electrically coupled to said control circuit, said speaker emitting sounds from within the determined specific stage of speech development.

4. The system according to claim 3, further comprising a plurality of control buttons, each of said control buttons being movably coupled to said stuffed animal, each of said control buttons being electrically coupled to said control circuit, each of said control buttons controlling operational parameters of said control circuit, said microphone and said speaker, each of said control buttons being positioned on a stomach of said stuffed animal.

5. The system according to claim 4, further comprising said vocal analyzer being positioned within said stuffed animal.

6. The system according to claim 4, further comprising said vocal analyzer being extrinsic to said stuffed animal.

7. The system according to claim 4, further comprising one of said control buttons being a selector operationally coupled to said control circuit such that said sounds played are from a selectable developmental stage of speech development corresponding to a setting of said selector instead of from the determined specific stage of development.

8. The system according to claim 3, further comprising a power supply being positioned within said stuffed animal, said power supply being electrically coupled to said control circuit, said power supply comprising at least one battery.

9. A speech development system being configured to record sounds made by a speed delayed child and emit sounds made by a speech advanced child for enhancing speech learning skills, said system comprising:
   a stuffed animal;
   a control circuit being positioned within said stuffed animal, said control circuit including an electronic memory;
   a microphone being coupled to said stuffed animal wherein said microphone is configured to record sounds produced by an infant or speech delayed toddler, said microphone being electrically coupled to said control circuit such that said electronic memory stores the sounds produced by the infant or speech delayed toddler;
   a transceiver positioned in said stuffed animal, said transceiver being operationally coupled to said control circuit;
   a database comprising sounds grouped according to defined stages of speech development, said database being accessible by said control circuit through said transceiver;
   a vocal analyzer, said vocal analyzer being communicatively coupled to said control circuit, said vocal analyzer analyzing the sounds produced by the infant or speech delayed toddler as recorded to said electronic memory, said vocal analyzer categorizing the sounds recorded to determine which of the defined stages of speech development corresponds to the sounds recorded, said vocal analyzer communicating with said control circuit for initiating playback of sounds within the defined stages of speech development corresponding to the sounds recorded;

a speaker being coupled to said stuffed animal wherein said speaker is configured to emit audible sounds outwardly therefrom, said speaker being electrically coupled to said control circuit, said speaker emitting sounds from within the determined specific stage of speech development;

a plurality of control buttons, each of said control buttons being movably coupled to said stuffed animal, each of said control buttons being electrically coupled to said control circuit, each of said control buttons controlling operational parameters of said control circuit, said microphone and said speaker, each of said control buttons being positioned on a stomach of said stuffed animal, one of said control buttons being a selector operationally coupled to said control circuit such that said sounds played are from a selectable developmental stage of speech development corresponding to a setting of said selector instead of of sounds within the defined stages of speech development corresponding to the sounds recorded; and a power supply being positioned within said stuffed animal, said power supply being electrically coupled to said control circuit, said power supply comprising at least one battery.

\* \* \* \* \*